Figure 1:
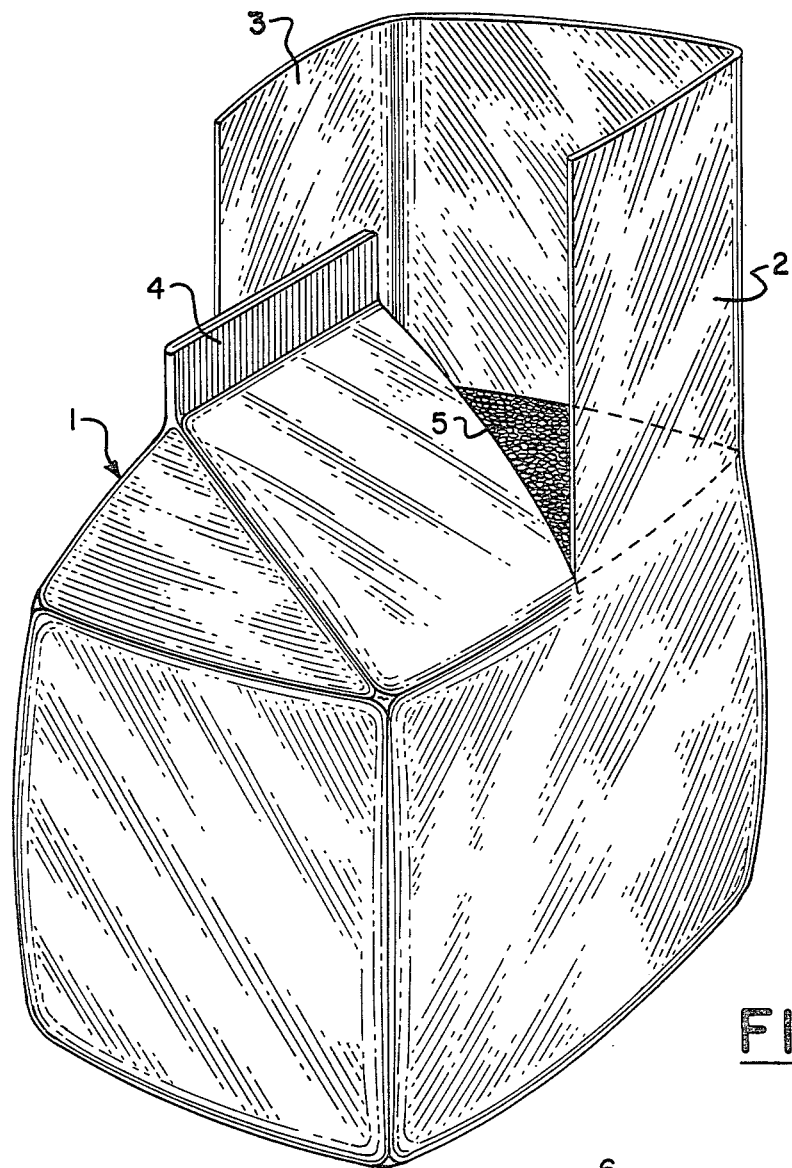

United States Patent [19]

Butler et al.

[11] 4,378,067
[45] Mar. 29, 1983

[54] PACKAGED RECLAIM RUBBER AND COMPOUNDED RUBBER PREPARED THEREFROM

[75] Inventors: Kim D. Butler, Uniontown; Ray A. Young, East Sparta, both of Ohio

[73] Assignee: The Goodyear Tire & Rubber Company, Akron, Ohio

[21] Appl. No.: 238,529

[22] Filed: Feb. 26, 1981

[51] Int. Cl.³ .................. B65D 81/00; B65D 85/00; B32B 7/02
[52] U.S. Cl. ............................. 206/447; 206/219; 206/83.5; 206/524.6; 206/524.7; 428/35
[58] Field of Search .................. 206/447, 83.5, 524.6, 206/524.7, 219; 428/35

[56] References Cited

U.S. PATENT DOCUMENTS

| | | | |
|---|---|---|---|
| 2,639,808 | 5/1953 | Barry et al. | 206/447 |
| 3,775,933 | 12/1973 | Prescott et al. | 206/83.5 |
| 4,112,158 | 9/1978 | Creekmore et al. | 206/447 |
| 4,190,156 | 2/1980 | Adam | 206/447 |
| 4,248,348 | 2/1981 | Butler et al. | 206/447 |

Primary Examiner—William T. Dixson, Jr.
Attorney, Agent, or Firm—H. C. Young, Jr.

[57] ABSTRACT

A package comprised of (A) reclaim rubber packaged in (B) a protective film of thermoplastic ethylene/acetate copolymer, the use of such a package for the purpose of compounding additional rubber and such compounded rubber. A method is also provided for compounding rubber using the packaged reclaim rubber of this invention and rubber and compound ingredients for the rubber which are also packaged in the prescribed film.

13 Claims, 2 Drawing Figures

PACKAGED RECLAIM RUBBER AND COMPOUNDED RUBBER PREPARED THEREFROM

FIELD OF INVENTION

This invention relates to packaged reclaim rubber and rubber compounded therewith.

BACKGROUND ART

It is often desired to reclaim vulcanized rubber. The vulcanized rubber is generally in the form of a manufactured article such as a pneumatic tire, industrial conveyor or power transmission belt, hose and the like. Scrap pneumatic tires are especially large source of such vulcanized rubber.

The vulcanized rubber is conventionally broken down and reclaimed by various processes, or combination of processes, which include physical breakdown, grinding, chemical breakdown and devulcanization and cryogenic grinding. If the vulcanized rubber contains wire or textile fiber reinforcement then it is generally removed by various processes which might include a magnetic separation, air aspiration and/or air floatation step.

In this description, the terms "reclaim" and "reclaimed rubber" are used somewhat interchangeably and relate to devulcanized rubber which is more completely hereinafter described.

It is important to appreciate that devulcanized reclaim or reclaimed rubber relates to rubber which has been vulcanized followed by being substantially devulcanized.

The resultant reclaim rubber is a polymeric material which has somewhat the appearance of unvulcanized rubber but has important differences and properties therefrom. First, it is a polymer which is, in essence, a partially vulcanized rubber composed of a mixture of polymer units of various and numerous constructions different from either unvulcanized or vulcanized rubber.

Secondly, the reclaim rubber, unlike conventional unvulcanized rubber, is also a complex mixture of largely unknown polymer(s), of compounding ingredients, possibly bits of textile fiber, and the like.

It has been observed that, after adding sulfur and accelerator to reclaim rubber, followed by its revulcanization, the resulting physical properties, such as tensile and elongation, are usually lower than the corresponding properties of the original vulcanized rubber from which it was derived. It has also sometimes been observed that exposed edges of bales or slabs of reclaim rubber have tended to curl up, apparently a result of oxidation degradation which was probably due to a deficiency of antidegradants which would normally have been adequately present in unvulcanized, compounded rubber.

It is further important to appreciate that the constitution of reclaim rubber composition itself is also dependent on both the reclaim process used and the actual source or composition of vulcanized rubber from which the reclaim is derived.

In manufacturing processes, reclaim rubber, usually along with the addition of other compounding ingredients, is conventionally mixed with unvulcanized rubber to form a compounded rubber mixture which, in turn, is shaped and cured to form a manufactured article.

Reclaim rubber, prior to further compounding, has conventionally been produced in the form of a slab or bale which is prevented from sticking to adjacent or stacked bales by dusting the slabs or bales with clay, soapstone or other anti-block agents. This has sometimes created an undesirable dust contamination in the work area. A usually more effective dust-free method of protecting reclaim rubber has been to package the reclaim in a manner similarly used for synthetic or natural unvulcanized rubber, namely, to wrap each bale in a protective film such as polyethylene film. Polyethylene packaging films, however, generally do not disperse easily in a rubber compound during mixing except somewhat at elevated temperature.

Unvulcanized rubber is typically compounded in at least one and usually a series of mixing stages.

A mixing stage relates to when a rubber compound is in a mixing machine and for duration of the time it is in the machine. There may be several mixing steps within the stage in which rubber or compounding ingredients are stepwise added and mixed.

For example, unvulcanized rubber can be compounded by mixing rubber and compounding ingredients in 1 to 5, or more, sequential mixing stages in which at least a portion of the mixed materials of a preceeding stage are mixed with additional materials in a succeeding mixing stage. More than one mixer or mixing machine may be used. As previously pointed out, the mixing may be done in stages where more than one mixing step is conducted in a stage. When two or more mixing stages are used, the temperature of the mixture in the first stage is generally substantially higher than the temperature of the mixture in the final or last stage of mixing where the curative is added.

For example, conventionally unvulcanized synthetic and/or natural rubber is at least added in the first and optionally, a portion thereof also added in a later stage; compounding ingredients for said unvulcanized rubber can be added in any or all of the stages, as may be desired, whereas a curing agent(s), other than accelerators, is added only in the last stage.

Thus, one stage of mixing, which may in reality be a series of steps, might be conducted all in one mixer. In this case, the curative would conventionally be added in the last step.

Reclaim rubber, although usually not considered in the same sense of a conventional compounding ingredient such as carbon black, curatives, processing aids, antidegradients, etc., is added in the mixture in the same manner as such conventional compounding ingredients.

It is important to appreciate that the reference to staged mixing of the unvulcanized rubber relates to a series of mixes. When mixing a batch in a mixer, it is generally desired that the volume of the mixer is practically full of the respective mixture itself. Therefore, in a staged mixing method, for example, unvulcanized rubber may be mixed in a first mixer (or stage) and the resultant mixture removed from the mixer itself. Then, only a portion of the mixed rubber might be added to a second mixer to which is then added additional compounding ingredients with the total mixture essentially or practically filling the mixer itself. The unused portion of the mixed rubber from the first stage can be saved for further use in another mixer.

Upon removal of the resultant mixture from the second mixer, only a portion of the second mixture might be added to a third mixer in which a similar mixing process is carried out. Such staged mixing is then continued through a sufficient number of stages, or mixers until all of the desired ingredients have been added and mixed to form the final compounded rubber.

An important difficulty experienced in such sequential mixing relates to the relatively lower temperatures required in the last or final mixing stages, in which the compounded rubber contains its curing agent(s), to prevent premature vulcanization.

Therefore, polyethylene film packaged reclaim rubber is typically introduced in an earlier mixing stage such as first or second stage, where the temperature is higher so that the film will more adequately disperse. This can be a particular disadvantage and require more mixing power for the overall mixing process because of the greater rubber volume or mass involved in the sequential stages, as compared to a reduced power requirement if the reclaim could be added in a later or last mixing stage. Such mixing power utilization is therefore of a relatively low mixing and energy efficiency.

Recognized alternatives are (1) to remove the polyethylene film from the reclaim bales or slabs and add the unwrapped reclaim directly to the last mixing stage or (2) to add dusted or soapstoned reclaim bales or slabs to the last mixing stage with an attendant potential dust contamination problem in the work area.

Therefore, it is desired to provide reclaim rubber as a package which can be useful as an ingredient for compounding unvulcanized rubber and to provide the resultant compounded rubber.

Such a package would desirably provide a more efficient use of mixing time and mixing volume by enabling the reclaim rubber to be added in a later mixing stage.

DISCLOSURE AND PRACTICE OF THE INVENTION

In accordance with this invention, a package is provided which comprises (A) reclaim rubber packaged in (B) a protective film having a thickness in the range of about 0.5 to about 10, preferably about 0.5 to about 5 mils of a thermoplastic ethylene/vinyl acetate copolymer containing an anti-block agent and having a vinyl acetate content in the range of about 11 to about 22, preferably about 14 to about 19 percent and further characterized, when having a thickness of about 2 to 4 mils, by a melting point in the range of about 85° C. to about 95° C., a minimum ultimate tensile strength at 25° C. of about 1850 psi, an oil solubility melt index of about 63° C. to about 75° C. and a minimum 300 percent modulus at 25° C. of about 700 psi.

It is to be appreciated that such package can be of a solid bale or slab of reclaim rubber or of reclaim rubber in particulate form.

It is understood that the film composite used in this invention desirably can contain various typical lubricants, fillers, pigments and dyes and stabilizers and is required to contain a minimal amount of anti-block agent sufficient to provide an anti-block quality to the surface of the film.

Although it is recognized that most reclaim rubbers are devulcanized rubbers of the high unsaturation type containing carbon-to-carbon double bonds and are therefor cured with the aid of sulfur and accelerators, other saturated rubbers can also be devulcanized which are initially cured with curatives such as peroxide.

It is recognized, U.S. Pat. No. 4,248,348 relates to the use of an ethylene/vinyl acetate copolymer of a particular composition as a packaging film for unvulcanized rubber and for packages of compounding ingredients. However, it is considered that reclaim rubber is clearly different from which is generally known as unvulcanized rubber and is not considered a normal compounding ingredient for unvulcanized rubber in a conventional sense for the purpose of this invention.

In further practice of this invention, a method of compounding rubber is provided, where the materials are mixed in at least one, preferably 2 to 5 or more, sequential mixing stages in at least one high shear mixer, and where at least two stages are used, at least a portion of the mixed materials of a preceeding stage are mixed with additional materials of a succeeding mixing stage; where the temperature of the mixture in the stages prior to the last stage is in the range of about 80° C. to about 200° C. and the temperature of the mixture in the last stage is in the range of about 65° C. to about 120° C.; where unvulcanized synthetic and/or natural rubber is at least added in the first stage and optionally a minor portion thereof also added prior to the last stage; where compounding ingredients for the rubber, other than curing agent(s) is added in at least two of the stages; whereas a curing agent(s), other than accelerators(s), is added only in the last stage; characterized in that packaged reclaim rubber of this invention is added in the last stage.

Alternately, the materials can be mixed together all in one high shear mixer, sometimes called a unit mix (a one stage mix). Thus, a carbon black-rubber master batch can be mixed with other ingredients in a sequential fashion in one high shear mixer. In the description of this invention, although the rubber is usually described as being compounded in internal mixers, usually high shear-type mixers, it is understood that mill mixes can also be accomplished.

In the practice of this invention, it is to be appreciated that curing agents are added in the last stage and accelerators therefor can, if desired, be added in an earlier stage.

The invention further relates to such compounded rubber which is sulfur cured.

Thus, the packaged reclaim rubber comprises the reclaim rubber, generally in the form of a solid bale or slab but optionally in the form of particulate granules such as chunks, pellets or powder, substantially encompassed with a wrap of the film required from this invention.

In the practice of this invention, the film can be applied around the reclaim rubber, especially when in bale or slab form, usually under some tension so that it more firmly wraps the rubber and then heat seals against itself to complete the package.

If the reclaim rubber is in particulate form, then it can conveniently be placed in a bag of such film with an opening in its top which can be optionally heat sealed.

The thermoplastic packaging film of this invention, containing a conventional-type anti-block agent, is characterized by being able to be pulled apart from itself after two sides being pressed together, without appreciably destroying the film.

In the practice of this invention, the film of the ethylene/vinyl acetate copolymer can be formed by extrusion or solution cast methods. Extrusion is often preferred. For solution casting, the copolymer and anti-block agent may be dissolved in an organic solvent followed by mixing therewith any additionally required materials. The mixture may be cast as a film onto a substrate, dried by evaporating the organic solvent to yield the required composition in the form of a film and the film stripped from the casting substrate. Typically, the mixture can probably be dried at a temperature of about 40° C. to about 150° C. depending primarily upon the organic solvent used. It should be readily understood that if the composition is to be dried as a thin film, reduced temperatures and times can probably be used such as, for example, a temperature in the range of about 70° C. to about 90° C. for a period of about 15 to about 60 minutes.

For the preparation of a compounded unvulcanized rubber, in addition to the packaged reclaim rubber used herein, various other compounding ingredients are mixed with the unvulcanized rubber. Such other ingredients can also optionally be packaged with the film used in this invention.

For example, various rubber compounding resins and ingredients, especially resins such as hydrocarbon resins, can optionally be packaged according to this invention and then compounded with unvulcanized rubber. Representative of the various compounding ingredients, whether or not so-packaged, which are conventionally used, are fillers, such as clay, silicates, calcium carbonate and the like; accelerators, such as, for example, cadmium diethyldithiocarbamate, tetramethylthiuram disulfide, benzothiazyl disulfide and the like; antioxidants, such as the well-known substituted thioesters and amine type; antiozonants, such as aniline derivatives, diamines and thioureas; curatives such as sulfur, sulfur providing compounds and peroxides; ultraviolet agents such as substituted benzotriazoles and substituted benzophenones; color pigments, such as iron oxide, titanium dioxides and organic dyes; reinforcing pigments, such as carbon black, zinc oxide and hydrated silicon compounds; and processing aids, such as silicon dioxide, pumice, stearate and rubber processing oils.

In this manner, the term "packaged" relates to both bagged or wrapped reclaim rubber. It also relates to bagged or wrapped compounding ingredients, and particularly to mixtures thereof containing about 0.5 to about 10, preferably about 0.5 to about 6 weight percent rubber processing oil. Such compounding ingredients, even when containing the rubber processing oil, are preferably free flowing without any substantial sticking together to impede their flow.

Unvulcanized rubber can also be advantageously packaged according to this invention, usually as bales of rubber. Representative of the various rubber of which their vulcanizates can be used in the practice of this invention as a source of reclaim rubber; and of various unvulcanized rubbers are natural rubber, synthetic cis-1,4-polyisoprene, polybutadiene, rubber butadiene/styrene copolymers and rubbery butadiene/acrylonitrile copolymers. All of such rubbers are of the high unsaturation type. Namely, they contain an appreciable amount of carbon-to-carbon double bonds therein suitable for sulfur vulcanization.

Although this invention is partly directed to the packaging of reclaimed high unsaturation-type rubber sulfur vulcanizates, the low unsaturation type can also be used if desired, although this is not usually considered the case. Representative of such low unsaturation rubbers are butyl rubber, which is typically a copolymer containing a major amount of isobutylene and a minor amount of isoprene, as well as the various ethylene/propylene copolymers and rubbery terpolymers of ethylene/propylene and a minor amount of non-conjugated diene.

An anti-block additive for the film of the package is particularly useful where the packaged material is rubber or reclaim rubber which is to be stacked or "containerized" together in order to prevent them from sticking to each other and making them virtually impossible to separate without actually destroying portions of the package and material. The importance of such an advantage is amplified by the following discussion.

Polyethylene film (PE) is heretofore often used to overwrap bales of reclaim rubber to simplify handling and use. For most applications, the overwrapped bale is used intact; thus, the bale is charged into a Banbury or another another suitable mixer and the PE film is mixed into the rubber compound during the mixing cycle. However, in various applications, the polyethylene film has not been sufficiently dispersed and has caused defects to occur in the cured end-product during use and is, therefore, not entirely a suitable overwrap or packaging material or container bag.

Films of this invention disperse substantially readily in a rubber compound when mixed using conventional equipment. Even if complete dispersion is not achieved, defects in the rubber, when cured, from the film are minimized because of its solubility and/or dispersability and plasticity in the rubber matrix.

Figure 2:
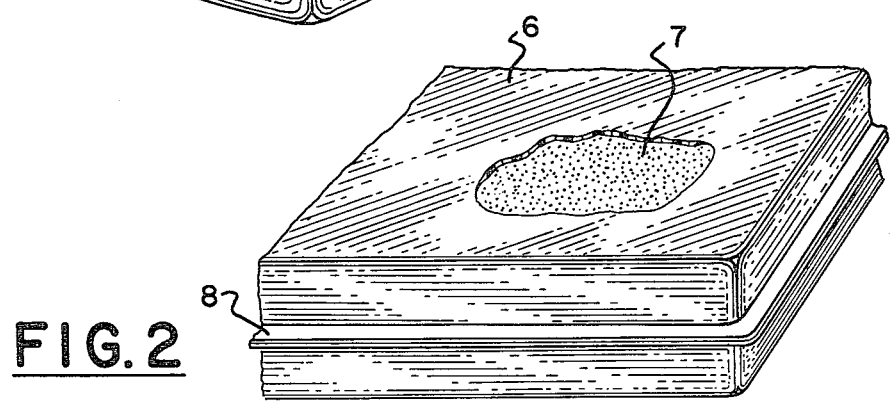

For further understanding of this invention, reference may be directed to the accompanying drawing in which FIG. 1 depicts a package comprised of reclaim rubber packaged in the required ethylene/vinyl acetate copolymer and FIG. 2 shows a package of reclaim rubber with the film.

Referring to the drawings, FIG. 1 shows a package comprised of a bag of ethylene/vinyl acetate film 2 containing about 16 percent vinyl acetate and having an opening at its top 3 which can be optionally sealed 4, such as by heat sealing. The package 1 contains reclaim rubber 5, optionally as a granular or particulate form.

FIG. 2 shows a packaged bale 6 of reclaimed vulcanizate rubber 7, packaged with the required form for this invention and heat sealed 8.

The practice of this invention is further illustrated by reference to the following example which is intended to be representative rather than restrictive of the scope of the invention. Unless otherwise indicated, all parts and percentages are by weight.

Example I

A series of ethylene/vinyl acetate films having a thickness in the range of about 2 to 4 mils were obtained. The individual tough translucent films had various vinyl acetate derived contents ranging from 5 to 29 percent.

A typical anti-block agent was included in the composition of the film.

Softening points of such various ethylene/vinyl acetate copolymer films which had been previously evaluated are reported in the following Table 1 and identified herein as films or Examples A–G. Example G is actually reported herein as a physical blend of polyethylene and poly(vinyl acetate) rather than a copolymer.

TABLE 1

| Films | Percent Vinyl Acetate | Softening Point[1] |
|---|---|---|
| A | 5 | 225° F. |
| B | 12 | 208 |
| C | 15 | 191 |
| D | 18 | 189 |

TABLE 1-continued

| Films | Percent Vinyl Acetate | Softening Point[1] |
|---|---|---|
| E | 20 | 189 |
| F | 29 | 126 |
| G | 28 | N/A[2] |

[1] determined by differential scanning calorimeter (DSC).
[2] not applicable since the film was a physical mixture.

The films had reportedly first evaluated or tested for (1) dispersability in mixtures containing 20 parts reclaim and 80 parts unvulcanized rubbers which mixtures were then sulfur vulcanized and examined. If the film passed this test, it was submitted to a stacking test (2) which comprised wrapping 100 pound bales of reclaim rubber and stacking the packages to an extent of five packages high in a heated, or hostile, environment of about 100° F. for a period of about six days; and (3) a handling test which comprises actual use under factory conditions.

Thus, generally, if the film did not pass the dispersability test, it was not submitted to the further tests.

The results of the tests are shown in the following Table 2 with the films or experiments, A–G corresponding to the films A–G of Table 1.

TABLE 2

| Film | Dispersion Test No. 1 | Stacking Test No. 2 | Handling Test No. 3 |
|---|---|---|---|
| A | failed | N/A | N/A |
| B | passed | passed | passed |
| C | passed | passed | passed |
| D | passed | passed | passed |
| E | passed | passed | passed |
| F | passed | passed | failed |
| G | failed | N/A | N/A |

Results of these tests show that (1) ethylene/vinyl acetate copolymer films containing from 12 to 20 percent vinyl acetate content passed tests designed to determine their suitability for use as packaging films for reclaim rubber which is to be mixed and cured with sulfur vulcanizable rubber; (2) copolymers with substantially more than 20 percent or less than 12 percent vinyl acetate content were found to not entirely pass these tests; and (3) physical blends of polyethylene and a substantial amount of polyvinyl acetate did not pass the dispersion test although a copolymer with similar vinyl acetate content did.

In this example, various amounts of reclaim were actually mixed with unvulcanized rubber ranging from 10 to 40 phr of reclaim. Further, an amount of film was utilized in the mixture in an amount on the order of about 100 times more film than would have been used if the reclaim had been packaged with the film.

While certain representative embodiments and details have been shown for the purpose of illustrating the invention, it will be apparent to those skilled in this art that various changes and modifications may be made therein without departing from the spirit or scope of the invention.

What is claimed is:

1. A package which comprises (A) reclaim rubber packaged in (B) a protective film having a thickness in the range of about 0.5 to about 10 mils of a thermoplastic ethylene/vinyl acetate copolymer containing an anti-block agent and having a vinyl acetate content in the range of about 11 to about 22 percent and further characterized, when having a thickness of about 2 to 4 mils, by a melting point in the range of about 85° C. to about 95° C., a minimum ultimate tensile strength at 25° C. of about 1850 psi, an oil solubility melt index of about 63° C. to about 75° C. and a minimum 300 percent modulus at 25° C. of about 700 psi.

2. The package of claim 1 where the reclaim rubber is in the form of a solid bale or slab substantially encompassed with said protective film which is heat sealed against itself.

3. The package of claim 1 where the reclaim rubber is in particulate form and in a bag of said film with an opening in its top which can be optionally heat sealed.

4. A compounded rubber comprised of a mixture of the package of claim 1 and unvulcanized rubber.

5. The compounded rubber of claim 4 comprised of a mixture of the package of claim 1, unvulcanized rubber and compounding ingredients therefor, of which at least a portion of such ingredients were packaged with said protective film.

6. The compounded rubber of claim 4 in which said unvulcanized rubber and of which vulcanizates thereof are a source for said reclaim rubber are those selected from at least one of natural rubber, synthetic cis-1,4-polyisoprene, polybutadiene, rubbery butadiene/styrene copolymers and rubber butadiene/acrylonitrile copolymers, butyl rubber, ethylene/propylene copolymers and rubbery terpolymers of ethylene/propylene and a minor amount of non-conjugated diene.

7. The compounded rubber of claim 5 in which said unvulcanized rubber and of which vulcanizates thereof are a source for said reclaim rubber are those selected from at least one of natural rubber, synthetic cis-1,4-polyisoprene, polybutadiene, rubbery butadiene/styrene copolymers and rubbery butadiene/acrylonitrile copolymers, butyl rubber, ethylene/propylene copolymers and rubbery terpolymers of ethylene/propylene and a minor amount of non-conjugated diene; and where said rubber compounding ingredients are selected from at least one of hydrocarbon resins, clay, silicates, calcium carbonate, accelerators, antioxidants, sulfur, sulfur-providing compounds, peroxides, ultraviolet agents, color pigments, titanium dioxide, organic dyes, carbon black, zinc oxide, hydrate silicon compounds, silicon dioxide, pumice, stearate and also a minor amount of rubber processing oil when mixed with at least one other of such compounding ingredients.

8. The sulfur cured compounded rubber of claims 4 or 5.

9. The cured compounded rubber of claims 6 or 7.

10. The compounded rubber of claims 4 or 5 where said copolymer of said film has a vinyl acetate derived content in the range of about 14 to about 19 percent.

11. A method of compounding rubber which comprises mixing in at least one mixing stage composed of a high-shear mixer, the package of claim 1 with unvulcanized rubber and compounding ingredients therefor.

12. The method of claim 11 comprised of 2 to 5 sequential mixing stages, each composed of high-shear mixers, in which at least a portion of the mixed materials of a preceeding stage are mixed with additional materials of a succeeding stage; where the temperature in the stages prior to the last stage is in the range of about 80° C. to about 200° C. and the temperature of the mixture in the last stage is in the range of about 65° C. to about 120° C.; where unvulcanized synthetic and/or natural rubber is at least added in the first stage and optionally a minor portion thereof also added prior to the last stage; where compounding ingredients for the rubber, other than curing agent(s), are added in at least two of the stages; and where curing agent(s) is added only in the last stage; characterized in that packaged reclaim rubber according to claim 1 is added in the last stage.

13. The method of claim 12 where at least a portion of said compounding ingredients are added as a package thereof in a protective film having a thickness in the range of about 0.5 to about 10 mils of a thermoplastic ethylene/vinyl acetate copolymer containing an antiblock agent and having a vinyl acetate content in the range of about 11 to about 22 percent and further characterized, when having a thickness of about 2 to 4 mils, by a melting point in the range of about 85° C. to about 95° C., a minimum ultimate tensile strength at 25° C. of about 1850 psi, an oil solubility melt index of about 63° C. to about 75° C. and a minimum 300 percent modulus at 25° C. of about 700 psi.

* * * * *